United States Patent [19]
Verstegen et al.

[11] 3,856,697
[45] Dec. 24, 1974

[54] LUMINESCENT ALKALI METAL GALLATE

[75] Inventors: Judicus Marinus Pieter Jan Verstegen; Emiel Petrus Juliaan De Meester, both of Emmasingel, Eindhoven, Netherlands

[73] Assignee: U.S. Philips Corporation, New York, N.Y.

[22] Filed: Oct. 29, 1973

[21] Appl. No.: 410,764

[30] Foreign Application Priority Data
Nov. 3, 1972    Netherlands...................... 7214859

[52] U.S. Cl.......................................... 252/301.4 R
[51] Int. Cl. ........................... C09k 1/04, C09k 1/68
[58] Field of Search .............................. 252/301.4 R

[56] References Cited
UNITED STATES PATENTS

| | | | |
|---|---|---|---|
| 3,499,843 | 3/1970 | Brown et al.................. | 252/301.4 R |
| 3,576,757 | 4/1971 | Brown.......................... | 252/301.4 R |
| 3,595,802 | 7/1971 | Blasse ......................... | 252/301.4 R |
| 3,635,833 | 1/1972 | Datta ........................... | 252/301.4 R |
| 3,723,339 | 3/1973 | Wanmaker et al....... | 252/301.4 R X |

FOREIGN PATENTS OR APPLICATIONS
1,190,520    5/1970    Great Britain............... 252/301.4 R OTHER PUBLICATIONS
Avella, "Chemical Abstracts," Vol. 75, P. 134550, 1971.

*Primary Examiner*—Jack Cooper
*Attorney, Agent, or Firm*—Frank R. Trifari; Norman N. Spain

[57] ABSTRACT

A luminescent gallate activated by bivalent manganese having a hexagonal crystal structure corresponding to the structure of $\beta$-alumina and defined by the formula:

$$(1-x)Me^I Ga_{11}O_{17} \cdot xMe^{II}Ga_{12}O_{19} : yMn^{2+}.$$

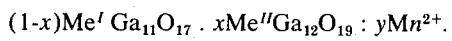

$Me^I$ is one or more of the alkali metals Na, K, Rb and Cs. $Me^{II}$ is one or more of the alkaline earth metals Sr, Ba and Ca. Up to 75 mol % of Ga may be replaced by Al. Furthermore there applies that $0 \leq x \leq 0.8$ and $0.0001 \leq y \leq 0.20$ said gallate can be used in low pressure mercury vapor discharge lamps.

5 Claims, No Drawings

LUMINESCENT ALKALI METAL GALLATE

The invention relates to a luminescent screen provided with a luminescent alkali gallate activated by bivalent manganese. Furthermore the invention relates to a low-pressure mercury vapour discharge lamp provided with such a luminescent screen and to the luminescent gallate itself.

A luminescent gallate activated by bivalent manganese defined by the formula $AGa_5O_8 : Mn^{2+}$ is known from U.S. Pat. No. 3,576,757 in which A represents one or more of the alkali metals potassium, sodium and lithium. These gallates can be excited by ultraviolet radiation and they emit green light whose spectral distribution is a band having a maximum at approximately 510 nm. The said patent specification does not state any particulars with respect to the crystal structure of these gallates. It is, however, known that $LiGa_5O_8$ may have the spinel crystal structure. It is known that the gallates defined by the above-mentioned formula in which A is sodium and/or potassium have a crystal structure analogous to the low temperature modification of $\beta$-alumina. This modification is generally denoted by $\beta''$-alumina (for example, $KAl_5O_8$).

Experiments which have led to the invention show that the high temperature modifications of the alkali gallates (having a crystal structure analogous to that of the high temperature modification of $\beta$-alumina) when activated with manganese constitute a group of new luminescent materials which upon excitation by ultraviolet radiation yield luminous fluxes which are much higher than those of the above-mentioned known gallates. Hereinafter $\beta$-alumina will be understood to mean exclusively the high temperature phase. The formula for $\beta$-alumina is $AAl_{11}O_{17}$ in which A represents an alkali metal with the exception of lithium.

According to the invention a luminescent screen is provided with a luminescent alkali gallate activated by bivalent manganese and is characterized in that the gallate has a hexagonal crystal structure which corresponds to the structure of $\beta$-alumina and that the gallate is defined by the formula:

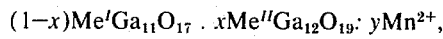

$$(1-x)Me'Ga_{11}O_{17} \cdot xMe''Ga_{12}O_{19} : yMn^{2+},$$

wherein Me' represents at least one of the alkali metals Na, K, Rb and Cs and Me'' represents at least one of the alkaline earth metals Sr, Ba and Ca, in which formula up to 75 mol % of Ga may be replaced by Al and $0 \leq x \leq 0.8$ and $0.0001 \leq y \leq 0.20$.

The luminescent gallates activated by bivalent manganese according to the invention have a crystal structure analogous to that of $\beta$-alumina and can be satisfactorily excited by ultraviolet radiation particularly shortwave ultraviolet radiation. A very intensive emission is then obtained in a narrow band (half value width approximately 25 – 30 nm) with a maximum at approximately 500 nm. These gallates can very advantageously be used in low-pressure mercury vapour discharge lamps particularly in such lamps for use in electrophotographic reproduction processes, e.g. in xerography.

One or more of the elements Na, K, Rb and Cs may be used as an alkali metal in the luminescent gallates according to the invention. It was found that the alkali metal in these gallates may partly be replaced by one or more of the alkaline earth metals Sr, Ba and Ca denoted by Me''. It is assumed that for low values of the alkaline earth content $x$ a solid solution is formed of $Me''Ga_{12}O_{19}$ in $Me'Ga_{11}O_{17}$. Compounds defined by the formula $Me''Ga_{12}O_{19}$ have the magnetoplumbite crystal structure which is closely related to the $\beta$-alumina structure. These magnetoplumbite lattices likewise constitute eminent host lattices for manganese activation (see Netherlands Patent Application 7,200,002). Replacement of Me' by Me'' generally has little influence on the luminescence properties of the materials obtained. When replacing large quantities of Me' by Me'' it is assumed that in addition to the $\beta$-alumina phase the magnetoplumbite phase is formed which is not disturbing. Due to the close relationship of the two said lattices it cannot be indicated with certainty up to which values of $x$ solid solutions are formed. Replacement of more than 80 mol % of Me' by Me'' ($x > 0.8$) is not used because then the magnetoplumbite already described in said Netherlands Patent Application is obtained.

Furthermore it was found that in the luminescent gallates according to the invention gallium may be replaced by aluminium while maintaining the crystal structure. With this replacement materials are generally obtained which have luminous fluxes upon excitation by ultraviolet radiation which are lower than those of the pure gallates. The aluminium-containing gallates are found to luminesce satisfactorily upon cathode-ray excitation as will be shown hereinafter. Replacement of more than 75 mol % of gallium by aluminium is not used because materials are then obtained which have a too low luminous flux upon excitation by ultraviolet radiation.

The manganese content $y$ of the luminescent gallates according to the invention may be chosen within the above-mentioned very wide limits. For values of $y$ of less than 0.0001 materials having a too low luminous flux for practical uses are obtained; for values of $y$ of more than 0.20 the luminous flux of the materials becomes too low due to concentration quenching.

Luminescent gallates according to the invention for which $x = 0$ and which are therefore defined by the formula $Me'Ga_{11}O_{17} : yMn^{2+}$ are preferred. Very high luminous fluxes are obtained with these alkali gallates.

Very high luminous fluxes upon excitation by ultraviolet radiation are particularly obtained by the gallates according to the invention which do not contain aluminium. Therefore these aluminium-free gallates are preferred.

It was found that the nature of the element used as Me' influences the luminous flux to be obtained of the luminescent gallate. The highest luminous fluxes are obtained with the gallates according to the invention in which Me' is potassium. Such materials are therefore preferred.

The manganese content $y$ in a luminescent gallate according to the invention is preferably chosen between 0.005 and 0.05 because then materials having the highest quantum efficiencies are obtained.

The luminescent gallates according to the invention may be manufactured by generally known methods for the synthesis of luminescent materials, for example, by means of a solid-state reaction. To this end a mixture of starting materials is heated one or more times at a high temperature, for example, every time for one hour. The oxides of the said elements or compounds which produce these oxides upon heating (for example, carbonates) are used as starting materials. In order to maintain or bring the manganese to the desired bivalent state at least a (last) heat treatment in a reducing atmosphere is generally required.

The heating temperature for the manufacture of the luminescent gallates according to the invention is to have a value which is at least equal to the transition temperature of the $\beta''$-alumina phase to the $\beta$-alumina phase. This transition temperature is dependent on the alkali metal chosen as Me$'$. It was found that sodium gallate is to be subjected to at least one firing treatment at or above approximately 1300°C. Potassium gallate is to be fired at or above approximately 1250°C and rubidium gallate is to be fired at or above approximately 1200°C. When manufacturing cesium gallate, substantially only the desired high temperature phase is formed during heat treatment at 1100°C. The $\beta$-alumina structure of the luminescent gallates according to the invention can be proved with the aid of X-ray diffraction analyses. These analyses yield X-ray diagrams which clearly differ from those of the $\beta''$-alumina phase.

The luminescent gallates according to the invention are preferably prepared by firing the starting mixture one or more times in air, which mixture comprises Me$'$ in the form of the carbonate in a relatively large excess above the stoechiometrically required quantity (for example, twice this stoechiometrical quantity). After this temperature treatment the excess of Me$'$ carbonate or Me$'$ oxide is washed and subsequently the product is subjected to a heat treatment in a weakly reducing atmosphere (for example in N2 comprising several % by volume of H$_2$).

The invention will now be described in greater detail with reference to the following example and with reference to measurements on a number of examples of luminescent gallates according to the invention all of which were manufactured in accordance with the above-described preferred method. The measurements are summarized in the tables following the example.

EXAMPLE $K_{0.96}Mn_{0.04}Ga_{11}O_{17}$ is prepared starting from a mixture of 0.691 g K$_2$CO$_3$
5.182 g Ga$_2$O$_3$
0.026 g MnCO$_3$ This mixture is fired for two hours in air at a temperature of 1350°C. After cooling the product obtained is washed with water. Subsequently the washed product is dried, ground and sieved and then subjected to two heat treatments in a weakly reducing atmosphere, each time for one-half hour at 1300°C. Each heat treatment is followed by cooling, mildly grinding and sieving the product.

TABLE I

| Example | Molecular composition | | | | | | LO in % | A in % (254 nm) |
|---|---|---|---|---|---|---|---|---|
| | Na | K | Rb | Cs | Ga | Mn | | |
| 1  | —    | 1.0  | —    | —    | 11 | 0.0010 | 99  | 96 |
| 2  | —    | 1.0  | —    | —    | 11 | 0.0025 | 123 | 97 |
| 3  | —    | 1.0  | —    | —    | 11 | 0.0050 | 138 | 96 |
| 4  | —    | 1.0  | —    | —    | 11 | 0.0075 | 162 | 95 |
| 5  | —    | 1.0  | —    | —    | 11 | 0.010  | 183 | 96 |
| 6  | —    | 1.0  | —    | —    | 11 | 0.020  | 196 | 94 |
| 7  | —    | 1.0  | —    | —    | 11 | 0.030  | 212 | 94 |
| 8  | —    | 1.0  | —    | —    | 11 | 0.040  | 219 | 93 |
| 9  | —    | 1.0  | —    | —    | 11 | 0.080  | 215 | 95 |
| 10 | —    | 1.0  | —    | —    | 11 | 0.150  | 210 | 96 |
| 11 | 0.25 | 0.75 | —    | —    | 11 | 0.005  | 146 | 88 |
| 12 | 0.50 | 0.50 | —    | —    | 11 | 0.005  | 135 | 92 |
| 13 | 0.75 | 0.25 | —    | —    | 11 | 0.005  | 100 | 94 |
| 14 | 1.0  | —    | —    | —    | 11 | 0.005  | 55  | 90 |
| 15 | —    | 0.75 | 0.25 | —    | 11 | 0.005  | 155 | 95 |
| 16 | —    | 0.50 | 0.50 | —    | 11 | 0.005  | 153 | 95 |
| 17 | —    | 0.25 | 0.75 | —    | 11 | 0.005  | 139 | 96 |
| 18 | —    | —    | 1.0  | —    | 11 | 0.005  | 135 | 96 |
| 19 | —    | —    | 0.75 | 0.25 | 11 | 0.005  | 145 | 96 |
| 20 | —    | —    | 0.50 | 0.50 | 11 | 0.005  | 139 | 95 |
| 21 | —    | —    | 0.25 | 0.75 | 11 | 0.005  | 150 | 92 |
| 22 | —    | —    | —    | 1.0  | 11 | 0.005  | 92  | 94 |

TABLE II

| Example | Molecular composition | | | | | LO in % | A in % (254 nm) | λ max in nm | hwb in nm | brightness in % |
|---|---|---|---|---|---|---|---|---|---|---|
| | K | Ga | Mn | Sr | Al | | | | | |
| 23 | 0.8 | 11.2  | 0.01 | 0.2 | —     | 179 | 96 | 500 | 25 | |
| 24 | 0.6 | 11.4  | 0.01 | 0.4 | —     | 171 | 96 | 500 | 25 | |
| 25 | 0.4 | 11.6  | 0.01 | 0.6 | —     | 189 | 96 | 500 | 25 | |
| 26 | 0.2 | 11.8  | 0.01 | 0.8 | —     | 194 | 97 | 500 | 25 | |
| 27 | 1.0 | 8.25  | 0.02 | —   | 2.75  | 129 | 76 | 503 | 26 | 129 |
| 28 | 1.0 | 5.5   | 0.02 | —   | 5.5   | 57  | 42 | 506 | 25 | 96 |
| 29 | 1.0 | 2.75  | 0.02 | —   | 8.25  | 6   | 6  | —   | —  | 58 |
| 30 | 0.5 | 5.75  | 0.02 | 0.5 | 5.75  | 58  | 41 | 507 | 27 | 106 |
| 31 | 0.5 | 8.625 | 0.02 | 0.5 | 2.875 | 137 | 77 | 505 | 27 | 133 |

The Tables state for each example the composition of the material and the results of measurements of the luminous flux (LO) upon excitation by short-wave ultraviolet radiation (predominantly 254 nm) and of the absorption (A) of the exciting radiation. The luminous flux LO is stated in % relative to the luminous flux of a luminescent calcium halophosphate activated by antimony and manganese which is mixed with non-luminescent calcium carbonate in such a quantity that the luminous flux of halophosphate has been reduced to approximately 50 %. The absorption A is stated in % relative to the UV absorption of zinc oxide. All materials according to examples 1 to 22 (Table I) were found to have their maximum emission at approximately 500 nm and a half value width of the emission band of approximately 25 nm. The Tables show that very high luminous fluxes can be obtained with the luminescent gallates according to the invention upon excitation by short-wave ultraviolet radiation. As compared with the known manganese-activated magnesium gallate aluminate having the spinel crystal structure (see the Netherlands Patent Application 6,702,017) which material is very suitable for lamps for xerography, the materials according to examples 6 and 7 of Table I have a peak height of the emission band of 119 and 121 %, respectively.

Table II furthermore states in the columns $\lambda_{max}$ and hwb the location of the maximum emission in the spectrum and the half value width of the emission band, respectively. Of the aluminium-containing gallates according to examples 27 to 31 the brightness upon excitation by electrons at an energy of 2.5 keV was also measured. The brightness is shown in the Table in % with respect to the brightness of a green-luminescing zinc oxide (known under the name of "P40") *).

*) see JEDEC (Joint Electron Device Engineering Councils) — publication No. 16-B (August 1971)

As already noted above the crystal structure of the luminescent gallates according to the invention can be determined with the aid of X-ray diffraction analyses. The $d$ values obtained by such an analysis of the material according to example 3 of Table I ($KGa_{11}O_{17}$ : 0.005 Mn) are mentioned in Table III below. The X-ray analysis shows that the material has a hexagonal crystal structure with a crystallographic a-axis of approximately 5.86 A and a c-axis of approximately 23.57 A. Table IV states the $d$ values of potassium gallate having the $\beta''$-alumina structure (low temperature modification: $KGa_5O_8$) which is manufactured by heating a mixture of starting materials at 1100°C. Tables III and IV show that the high temperature and the low temperature modifications of the alkali gallates can be clearly distinguished by means of X-ray diffraction analyses.

TABLE III $d$ values $KGa_{11}O_{17}$

| | | |
|---|---|---|
| 9.147 | 2.507 | 1.675 |
| 5.834 | 2.503 | 1.656 |
| 4.628 | 2.466 | 1.628 |
| 4.239 | 2.399 | 1.615 |
| 3.831 | 2.333 | 1.597 |
| 3.093 | 2.318 | 1.545 |
| 2.925 | 2.221 | 1.479 |
| 2.908 | 2.120 | 1.467 |
| 2.781 | 2.014 | 1.457 |
| 2.605 | 1.717 | 1.414 |
| 2.518 | 1.697 | |

TABLE IV $d$ values $KGa_5O_8$

| | |
|---|---|
| 11.622 | 2.335 |
| 5.831 | 2.255 |
| 4.849 | 2.053 |
| 4.384 | 1.679 |
| 2.941 | 1.660 |
| 2.900 | 1.638 |
| 2.706 | 1.546 |
| 2.606 | 1.455 |
| 2.509 | |
| 2.422 | |
| 2.375 | |

What is claimed is:

1. A luminescent alkali gallate activated by bivalent manganese which has a hexagonal crystal structure corresponding to the structure of $\beta$-alumina and which is defined by the formula:

$$(1-x)Me'Ga_{11}O_{17} \cdot xMe''Ga_{12}O_{19} : yMn^{2+},$$

in which $Me'$ represents at least one of the alkali metals Na, K, Rb and Cs and $Me''$ represents at least one of the alkaline earth metals Sr, Ba and Ca, in which formula from zero up to 75 mol % of Ga is replaced by Al and $O \leq x \leq 0.8$ and $0.0001 \leq y \leq 0.20$.

2. A luminescent gallate as claimed in claim 1, characterized in that the gallate is defined by the formula $Me'Ga_{11}O_{17} : yMn^{2+}$.

3. A luminescent gallate as claimed in claim 2, characterized in that $Me'$ is K.

4. A luminescent gallate as claimed in claim 1, characterized in that the gallate is free from aluminum.

5. A luminescent gallate as claimed in claim 1, characterized in that $0.0005 \leq y \leq 0.05$.

* * * * *